Oct. 10, 1950     W. F. GROENE ET AL     2,525,127
HYDRAULIC FEED AND CONTROL MECHANISM
Original Filed Jan. 11, 1945     5 Sheets-Sheet 5

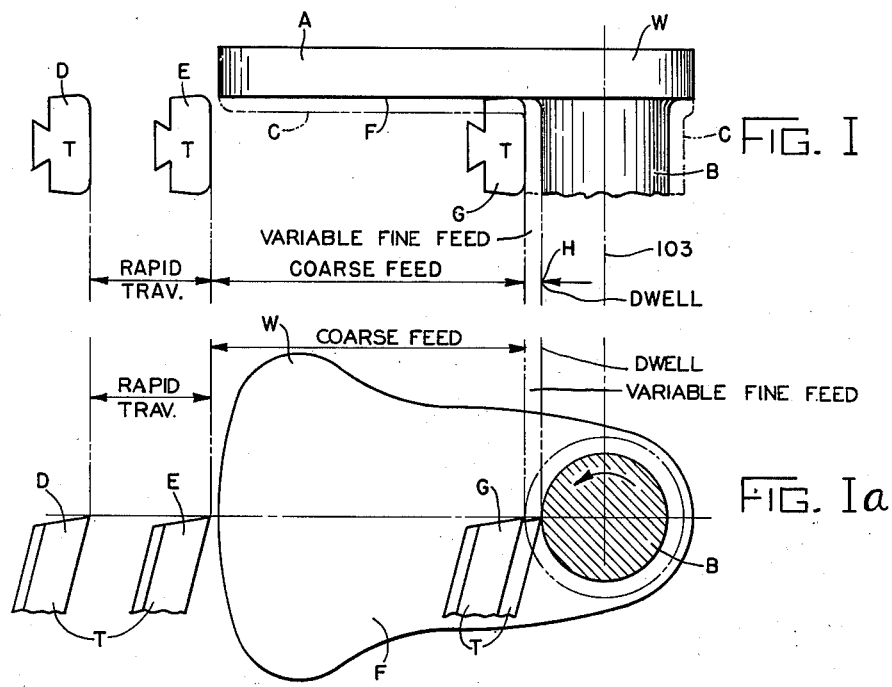
FIG. I
FIG. Ia
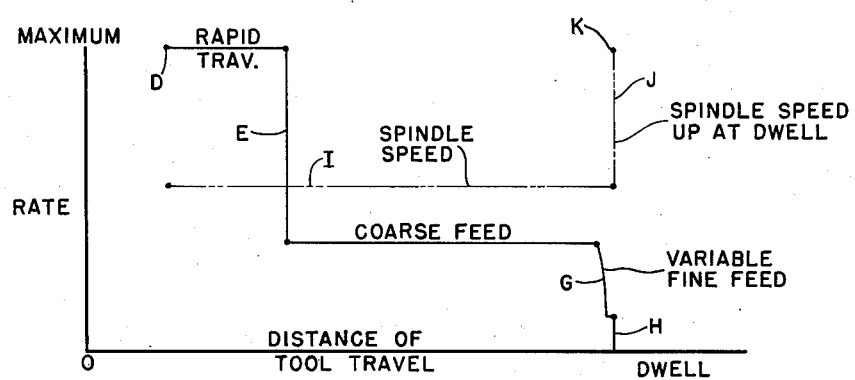
FIG. II
INVENTORS.
WILLIAM F. GROENE,
HAROLD J. SIEKMANN
AND WALTER R. MEYER
BY Toulmin & Toulmin
ATTORNEYS.

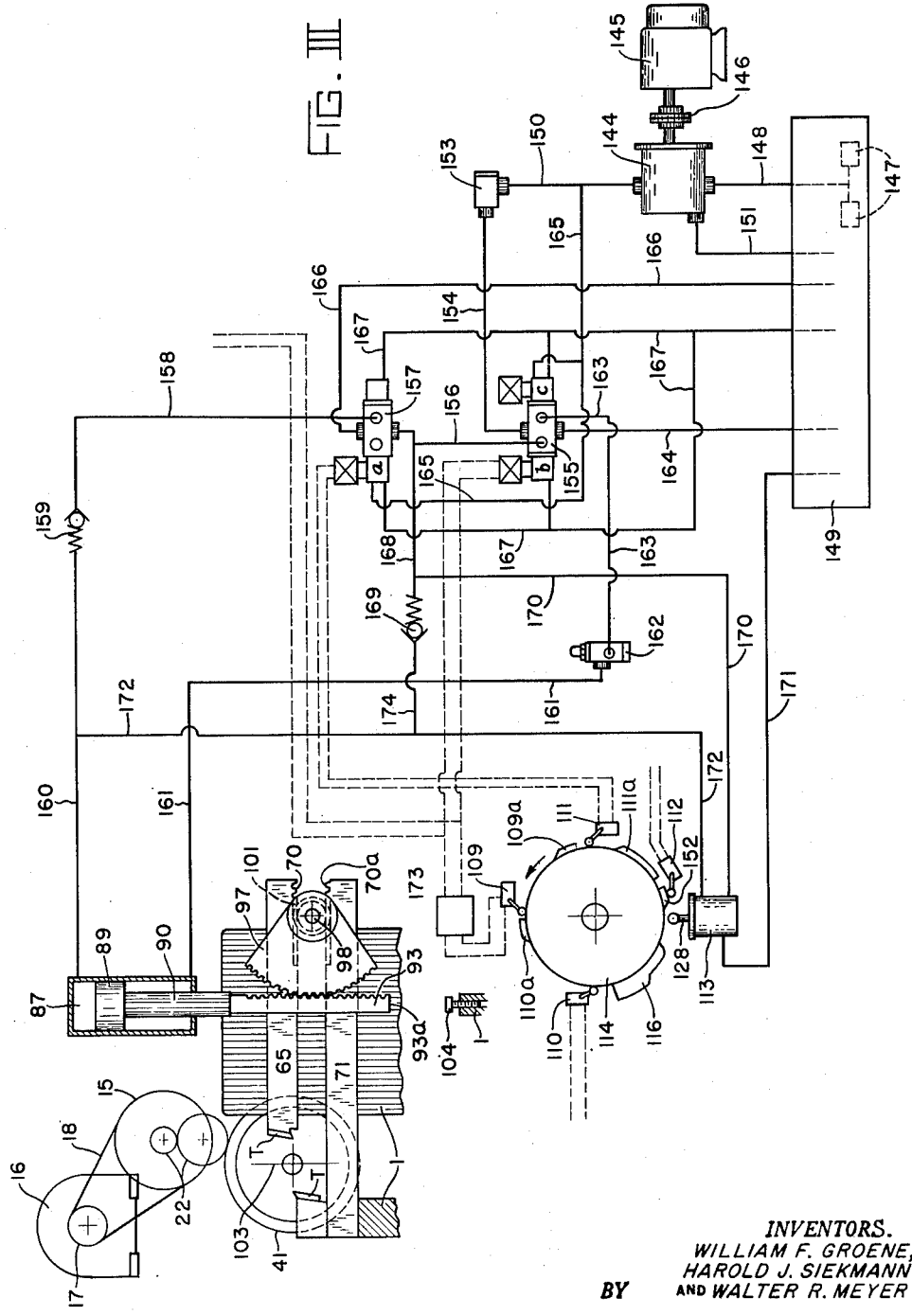

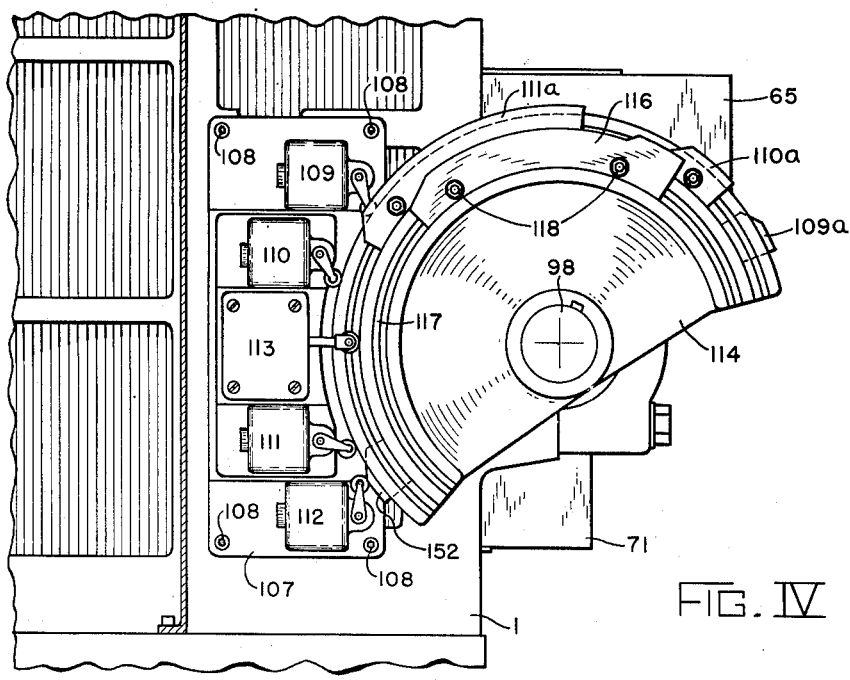
FIG. IV
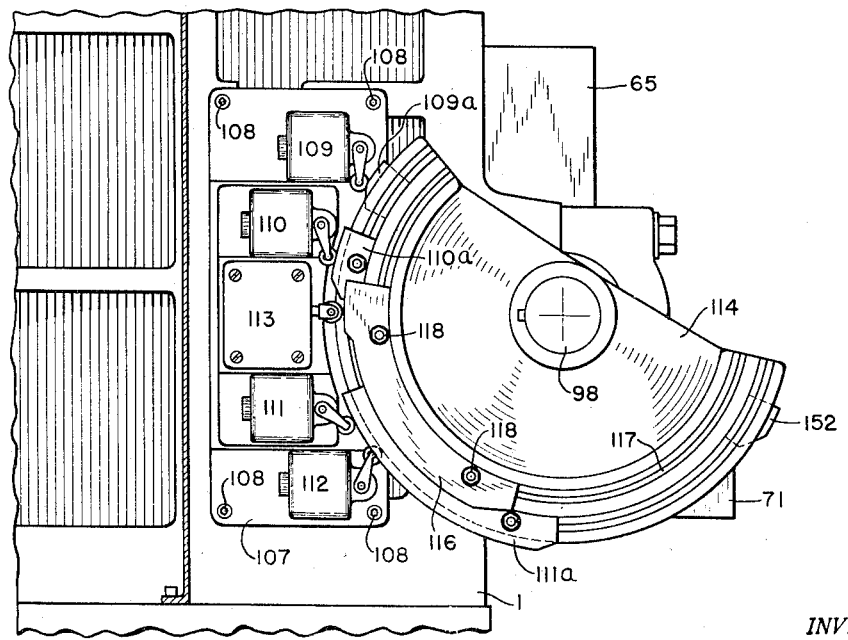
FIG. V
INVENTORS.
WILLIAM F. GROENE,
HAROLD J. SIEKMANN
BY AND WALTER R. MEYER
Toulmin & Toulmin
ATTORNEYS.

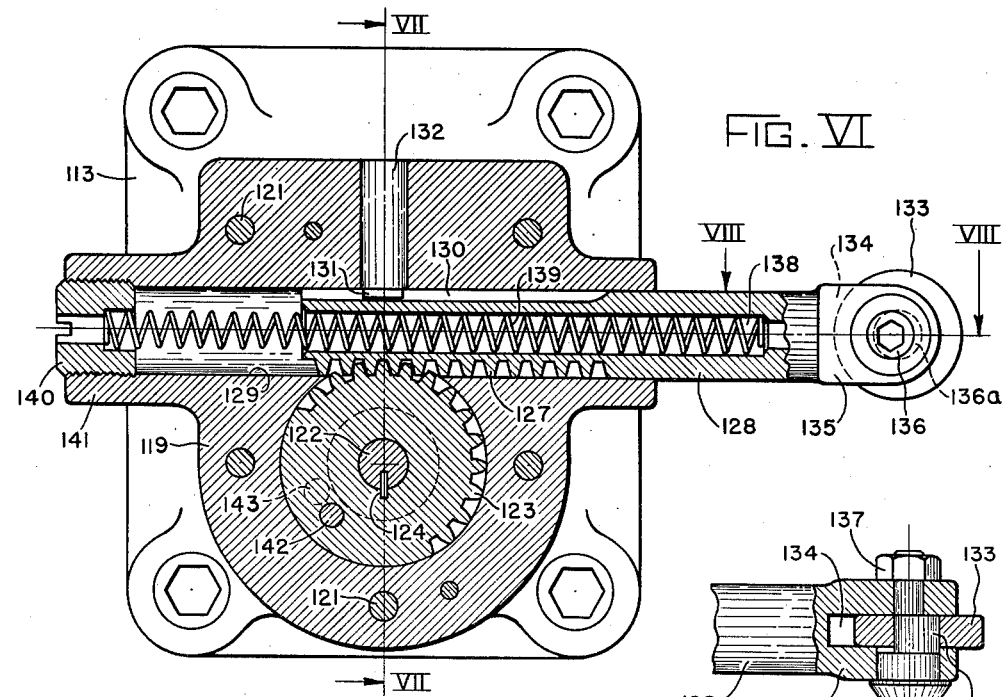
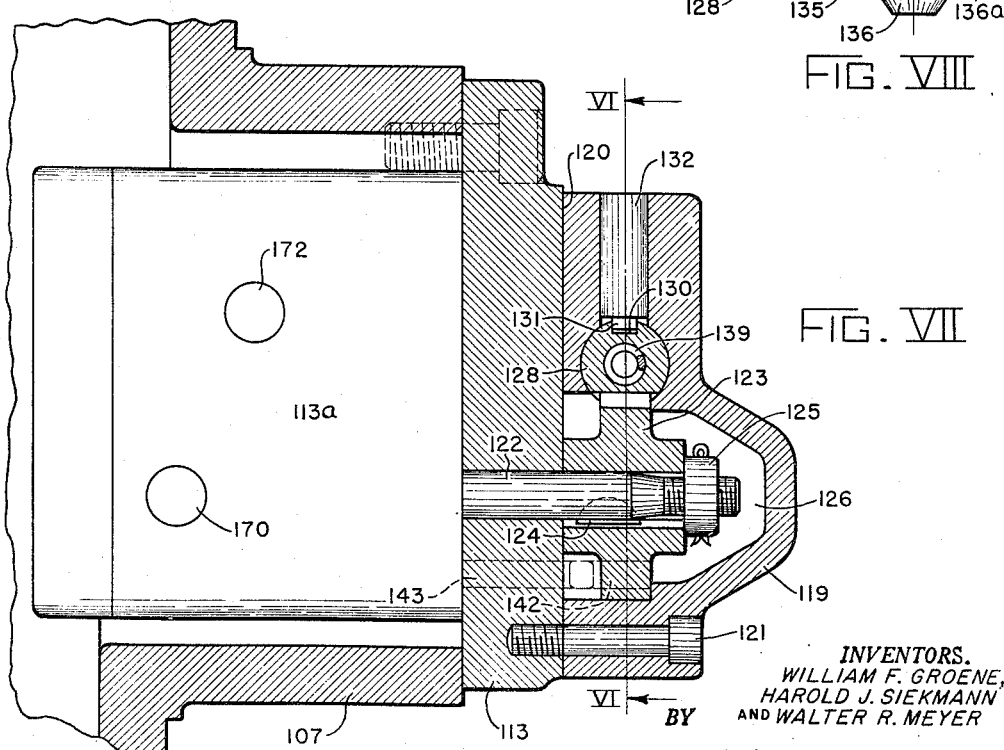

FIG. IX

INVENTORS.
WILLIAM F. GROENE,
HAROLD J. SIEKMANN
BY AND WALTER R. MEYER

Willard S. Groene
ATTORNEYS.

Patented Oct. 10, 1950

2,525,127

UNITED STATES PATENT OFFICE 2,525,127

HYDRAULIC FEED AND CONTROL MECHANISM

William F. Groene, Harold J. Siekmann, and Walter R. Meyer, Cincinnati, Ohio, assignors to The R. K. Le Blond Machine Tool Company, Cincinnati, Ohio, a corporation of Delaware Original application January 11, 1945, Serial No. 572,388, now Patent No. 2,470,304, dated May 17, 1949. Divided and this application March 26, 1946, Serial No. 657,272

6 Claims. (Cl. 60—52)

This invention relates to hydraulic and electric control mechanism for lathes, particularly lathes of the center drive type intended for machining the bearing portions of crankshafts or similar work pieces. The machine we have selected for illustrating our invention is intended more particularly for simultaneous machining of the stub end, flange end, cheek portions of the webs, and the line bearings of multi-throw crankshafts such as are used in multi-cylinder internal combustion engines.

The application is a divisional application of original application, Serial No. 572,388, filed January 11, 1945, now Patent No. 2,470,304, issued May 17, 1949.

One of the objects of this invention is to provide a hydraulic and electrical control system for automatically determining a sequential selection of feed movements for the tools and rate of rotation of the work piece during an automatic machining cycle.

A further object of this invention is to provide an improved electric hydraulic control mechanism for a crankshaft lathe for automatically regulating the rate of feed and spindle speed in a most efficient manner to produce a work piece of a high degree of accuracy and a fine finish.

A further object is to provide a hydraulic and electric control system for a machine in which the tools are automatically controlled in rapid traverse movement toward the work, automatically slowed just before the cutting begins, and controlled in slow feeding movement into the work at a speed which may be varied as desired, while automatically speeding up rotation of the work piece as the cutting tools reach the final desired depth of cut on the completed work.

And still another object of this invention is to provide a fully automatic crankshaft lathe feed control and operating mechanism through the use of an inter-related hydraulic and electrical system including control valves and switch mechanism operated in a predetermined sequential relationship by the retracting and advancing movement of the tool relative to the work.

Still another object is to provide a hydraulic operating system for a lathe which is controlled by a disc carrying a plurality of cams adjustable about the periphery thereof, each cam controlling an appropriate electric control switch or hydraulic valve for regulating said hydraulic system, the cam disc being rotated in control movement by the relative movement of work and tool of the machine.

Further features and advantages of this invention will appear from a detailed description of the drawings in which:

Figure I is a diagrammatic view showing the typical relationship of work and tool in a crankshaft turning operation in a machine to which this novel hydraulic and electric system is preferably adapted.

Figure Ia is a view comparable to Figure I but taken on a plane normal thereto.

Figure II shows the relative rate of movement of work and tool during a complete machining cycle in a machine incorporating the features of this invention.

Figure III is a diagrammatic view of the hydraulic circuit shown applied to a typical crankshaft lathe tool bar feed mechanism including the segmental cam control disc and associated control mechanisms, incorporating the features of this invention.

Figure IV is an enlarged view of the segmental cam control disc shown in the position of full retraction of the cutting tools at the beginning of a cutting cycle.

Figure V is a similar enlarged view to that of Figure IV but showing the segmental cam control disc in the position of full infeed movement of the tools to depth into the work.

Figure VI is an enlarged sectional view of the control mechanism for actuating the feed rate control valve indicated on the line VI—VI of Figure VII.

Figure VII is an enlarged sectional view of the same control mechanism shown in Figure VI but indicated on the line VII—VII in Figure VI.

Figure VIII is a sectional view on the line VIII—VIII of Figure VI showing in particular the eccentric mounting provided for fine adjustment of the feed rate control valve actuating roller.

Figure IX is an elementary wiring diagram showing the circuit for the hydraulic valve controlling solenoids, the main drive motor, and the hydraulic system drive motor.

A typical crankshaft turning operation to be carried out and controlled by applicants' hydraulic and electric control mechanism is illustrated in Figures I and Ia, where is shown the relationship of work and tool during a complete machining cycle.

The work crankshaft W comprises a web or cheek portion A having an integral pin or line bearing portion B. The stock to be removed from these portions of the crankshaft is indicated by the broken section lines C. Cutting tools, only one of which is here shown, are usually fed from diametrically opposite directions relative to the axis 103 of the pin or bearing portion on the work axis of the lathe. The tool starts from the initial retracted position D and is actuated at a rapid traverse rate until it arrives at position E of initial engagement with the material C to be cut away from the cheek face F of the crankshaft web A. The tool is then reduced in rate of feed movement to a coarse feed while it cuts down the cheek face F and comes into initial cutting contact with the metal C surrounding the pin or bearing portion B of the crankshaft as indicated at G. At this point, the feed movement of the tool is still further reduced to a fine decreasing feeding movement as it continues to depth or dwell position at H where the tool is brought to a definite predetermined fixed stop position relative to the work axis 103 around which the work piece is rotating. The tool is then held in this depth or dwell position for several revolutions of the work piece to finish a highly accurate polished surface on the bearing B. After the completion of this finishing operation, the tool is then rapidly retracted back to initial starting position D.

The rate of rotation of the work is also automatically controlled in a predetermined sequential relationship with the above mentioned feed rate variation of the cutting tools. This is clearly illustrated in the diagram, Figure II, wherein it will be seen that during the initial infeed movement of the tool through rapid traverse, coarse feed, and fine feed to dwell position the rotation of the work piece is maintained at a predetermined relatively slow spindle speed indicated at I in the diagram. As the cutting tools approach the dwell position H, the speed of the work spindle is increased at J up to a high rate indicated at K while the tool is held in fixed rubbing finishing contact position with the work piece diameter B. This particular method of operation results in freedom from chatter and a high degree of finish for the work surface at the conclusion of movement of the cutting tool to depth.

After a predetermined interval of time has elapsed, with the tools thus in dwell contact and with high speed spindle rotation taking place, the work is stopped in rotation and then the cutting tool is retracted back to initial starting position B at a rapid traverse rate. The purpose of stopping the work rotation completely from withdrawing the tool from dwell position to retracted position is so that the cutting edge of the tool does not scrape against the finished face F of the crankshaft web A and gouge a spiral groove in this surface as it retracts backwardly to initial starting position, which would be the case if the work were rotating during this retraction movement.

As illustrative of a machine involving the above mode of operation and to which the hydraulic and electric operating and control mechanism of applicants' invention is particularly well adapted, there is shown diagrammatically in Figure III a center drive line bearing crankshaft lathe having a frame 1 upon which is suitably mounted the center drive ring gear chuck 41 for gripping and supporting the crankshaft or work piece W and to rotate it at an appropriate cutting speed. The center drive ring gear chuck 41 is driven from the main drive motor 16 having a pulley 17 over which operates belts to drive the main drive pulley 15 which in turn is connected through suitable transmission gearing 22 to rotate the ring gear 41.

Also mounted on the frame 1 of the machine is a pair of oppositely reciprocatable tool bars 65 and 71 each carrying appropriate cutting tools T, in this case adapted to be fed relative to the work axis 103 from opposite sides thereof to perform cutting operations on the work piece. The tool bars 65 and 71 are actuated in oppositely reciprocatable motion by a pinion 101 carried on the rock shaft 98 which is suitably journaled in the frame 1 of the machine. The pinion 101 engages the respective racks 70 and 70a of the tool bars 65 and 71. Also fixed on the rock shaft 98 is the segmental gear 97 which engages in the rack 93 connected to the piston rod or movable element 90 of the piston 89 of the main feed or fluid pressure actuating cylinder 87. Thus, reciprocation of the piston 89 in the cylinder 87 by appropriately applying pressure thereto through the line 160 or 161 will affect reciprocatory feeding and rapid traverse movement in the desired direction in the tool bars 65 and 71 and in the tools T mounted thereon. The feed movement of the tool bars is stopped at a predetermined fixed position by the engagement of the end 93a of the rack 93 with a fixed abutment stop screw 104 carried in the machine frame 1.

On the rock shaft 98 is fixed a segmental or cam disc 114. Disc 114 has a number of axially offset peripheral T-slots 117, whereby a series of cams 109a, 110a, 111a, 116, and 152 are fixed in adjusted positions along the respective slots by means of T-head bolts 118. A bracket 107 is fixed to frame 8 adjacent the periphery of disc 114, as by screws 108, and switching means comprising a series of switches 109, 110, 111, and 112 are fixed to said bracket in positions so that their switch arms are moved to circuit-closing position by the respective cams, as disc 114 is rotated in timed relation with feeding movement of the cutting tools. In addition, a valve 113 is attached to bracket 107 and has a plunger 128 positioned to be operated at a selected time during each work cycle, by cam 116.

Referring to Figures VI, VII, and VIII, valve 113 consists of a valve body 113a having hydraulic connections, two of which are shown at 170 and 172. The particular valve mechanism may be of the rotary balanced type rate varying valve or any other well-known type, and hence need not be shown in detail. Suffice it to say that an operating shaft 122 whose rotation operates to vary the effective passageway for fluid through the valve, extends into a chamber 126 formed by a bracket 119 attached to valve 113 by screws 121. A pinion 123 is fixed upon shaft 122 by a key 124 and a lock nut 125. Bracket 119 is formed with a bore 129 whose axis extends tangentially of gear 123, and a plunger 128, having a rack 127 formed thereon, is slidably fitted within said bore with the rack teeth in mesh with gear 123. A groove 130 is formed longitudinally in plunger 128 and the squared end 131 of a pin 132 carried by bracket 119, projects into this groove and acts to limit the movement of plunger 128 to reciprocation. Plunger 128 is counterbored, as at 138, to receive one end of a spring 139, the other end of which is located within a hollow plug 140 closing the other end of bore 129. This spring therefore acts to urge plunger 128 outwardly toward cam disc 114. The outward end of plunger 128 is forked as at 135; Figure VIII, and has aligned holes within which a stud 136 is held by a nut 137. Stud 136 has a central cylindrical portion 136a whose axis is eccentric to the axis of stud 136, and a cam roller 133 is mounted upon portion 136a. By loosening nut 137 and applying a wrench to a socket head in stud 136, the latter may be adjusted to slightly vary the effective length of plunger 128 and thus provide for adjustment in setting said plunger with respect to cam 116. Thus, as disc 114 is rotated in timed relation with the feeding movements of the tools, cam 116 engages roller 133 and reciprocates plunger 128 inwardly against the action of spring 139, to rotate gear 123 and actuate the valve mechanism to reduce the effective passageway therethrough. The purpose of this will be subsequently explained as well as the function of switches 109, 110, 111 and 112 in cooperation with disc 114 and the cams thereon.

Figure III is a diagram of the hydraulic and electrical control system of our invention and, for clarity, disc 114 has been shown as extending throughout 360° of arc, with the several cams and the switches controlled thereby, spaced about its periphery.

In our preferred embodiment, however, a segment extending through approximately 215° of arc is used, as shown in Figures IV and V. It will be clear that there is nothing critical about the angular extent of said segment but that said extent may be greater or smaller depending upon the radius of sector gear 97, while, for any given angular size, the length of the cams will be correspondingly varied in accordance with the desired time relations of the various functions performed by the machine.

Fluid under pressure, is supplied by a fluid pressure pump 144 of any desired type, driven by a motor 145. Pump 144 draws fluid from a reservoir 149, through filters 147 and line 148. Drainage from a relief valve in the pump 144, for maintaining pressure in the line 150, is exhausted through the line 151 which returns the fluid to the reservoir 149. A delivery line leads by way of line 150, pilot pressure valve 153, line 154, feed valve 155, line 156, valve 157, line 158, check valve 159, and line 160, to cylinder 87, previously described.

Feed valve 155 is of the balanced three-way spring centered type having booster connections at each end from high pressure line 165 and drainage connections to line 167. A pair of solenoids $b$ and $c$ are connected to the valve core and, in conjunction with the valve spring, operate to move said core into three different positions depending, respectively, upon whether both $b$ and $c$ are de-energized, $b$ only is energized, or $c$ only is energized. When both solenoids $b$ and $c$ are de-energized, valve 155 acts to connect high pressure supply line 154 to forward traverse line 156, and service line 163 to exhaust line 164. When solenoid $b$ only is energized, high pressure line 154 is connected to line 163 and line 156 is connected to exhaust line 164; and when solenoid $c$ only is energized, high pressure line 154 is connected directly to exhaust line 164.

Valve 157 is of the spring offset two-way solenoid operated type having a high pressure booster connection from line 165 and a drainage connection to line 167. A solenoid $a$ is provided and is connected to operate the valve core. When solenoid $a$ is de-energized the valve connects line 156 to line 158. When solenoid $a$ is energized, the passageway from line 156 to line 158 is closed.

Valves 155 and 157 are well known and, per se, form no part of our invention.

A line 161 connects the lower end of cylinder 87 with line 163 and valve 155, through a back pressure valve 162. A line 168 leads from line 156 and is connected through a line 170 to valve 113, previously described. From valve 113 a line 172 connects to line 160, which, it will be remembered, extends from check valve 159 to the upper end of cylinder 87. A branch line 174 connects lines 172 and 168 through a check valve 169 so that fluid may flow from 174 into 168, but not in the reverse direction. A draining line 171 extends from valve 113 to reservoir 149.

Solenoid $a$ of valve 157, is connected by a line 111b with a "forward traverse to feed" switch 111. Solenoid $b$ of valve 155 is connected by a line 109b to return traverse and main motor control switch 109. A time relay 173 is inserted in line 109b so that solenoid $b$ is energized a few seconds after operation of switch 109. A branch line 109c extends from line 109b and is effective through any well-known relay control, to open the circuit of the main driving motor 16. Solenoid $c$ is connected so as to be energized automatically by and upon energization of motor 145, as by any well-known relay-controlled circuit. The circuit including solenoid $c$ has a relay therein whereby, upon energization of switch 112, said circuit is opened and the solenoid is deenergized. In other words, the connections are such that solenoid $c$ is energized only when motor 145 is operating and switch 112 is not energized.

The main driving motor 16 is a two-speed machine and has a circuit connected to switch 110 so that, when said switch is closed by contact of cam 110a, the motor speed is changed from lower to higher.

In operation motor 145 is started and solenoid $c$ is thereby energized to shift valve 155 to position connecting high pressure line 154 to exhaust line 164 whereby fluid delivered to line 154 simply returns to reservoir 149. A work piece is loaded into the lathe and the main drive motor 16 is started to thus rotate the work piece at the speed corresponding to the slower speed of motor 16. At this time, the operating arm of switch 112 is resting on cam 152, as shown in Figure IV; and it will be noted that all other cams are out of contact with their respective arms. Closing of the circuit to the main drive motor, energizes switch 112 and opens the circuit to solenoid $c$, as aforesaid. Valve 155 is thereby operated to connect high pressure line 154 to forward traverse line 156, and to connect line 161 to exhaust line 164. Fluid under pressure now flows from line 156, through valve 157, and lines 158, 160 to cylinder 87. Piston 89 and rack 93 are thereby forced downwardly at their maximum rate to rotate gear sector 97 and disc 114. At this time, fluid is exhausted from the lower end of the cylinder 87 by way of line 161, valve 162, line 163, and valve 155 to exhaust line 164. The tools are thus rapidly traversed toward the rotating work piece.

Just prior to contact of the tools with the work as, for example, when they are about to begin cutting down the cheeks of a crankshaft, cam 116 engages roller 133 and operates to partially close valve 113. A short interval thereafter cam 111a engages and closes its switch 111 to thereby energize solenoid $a$. Valve 157 is thereby operated to cut off the passage from line 156 to 158. Fluid in line 156 is now forced to pass into line 168, and, since it cannot pass through check valve 169, it enters line 170, through valve 113, and line 172 to line 160. Since it cannot escape through check valve 159, it passes to cylinder 87 at a much reduced rate because of the partial closing of valve 113 by cam 116. Thereore, the tools are fed into the work at reduced speed.

The feeding speed of the tools is still further gradually reduced when a high riser on cam 116 operates to further progressively restrict the flow of fluid through valve 113 as the tools begin cutting the line bearings B of the work piece. Shortly thereafter, and at substantially the same time, cam 109a engages and operates its switch 109, cam 110a engages and operates its switch 110, and rack 93 engages stop pin 104 to thereby stop further feeding of the tools. Operation of switch 110 acts to speed up the driving motor 16 and rotate the work at an increased rate, to thereby finish the bearing surfaces to a high degree of accuracy. Due to time relay 173, this high speed finishing cut continues for a few seconds. Relay 173 then acts to energize solenoid b and also to stop driving motor 16. During the aforesaid finishing of the bearing surfaces, full pressure acts on piston 89 to hold rack 93 firmly against stop pin 104.

Energization of solenoid b operates valve 155 to connect high pressure line 154 to line 163, and line 156 to exhaust line 164. Fluid under pressure now passes to line 163, through valve 162 and line 161 and the lower end of cylinder 87 to force piston 89 upwardly and effect rapid retraction movement of the tools. During this movement, fluid above piston 89 exhausts through lines 160, 172, 174, valve 169, lines 168 and 156 to valve 155, thence to exhaust line 164. Simultaneously with retraction of the tools cam disc 114 is reversely rotated until, when cam 152 contacts switch 112, solenoid c is again energized and valve 155 is shifted to by-pass the delivery of pump 144 from line 154 to exhaust line 164. The tools are thereby brought to rest whereupon the finished work piece is removed and an unfinished one loaded into the machine to repeat the cycle just described.

The electric control circuit particularly illustrated in Figure IX is adjusted by the operator by a suitable manually operated control panel located on the machine for easy accessability to the operator.

Conditioning switch 183 is closed to connect main lines 184 and 185. Switch 186 is then closed whereupon hydraulic motor 145 is energized by way of line 185, switch 186, line 187, motor 145, line 188, and main line 189. At the same time, energization of motor 145 operates to close normally open relay 145a. As cam 152 is at this time closing switch 112, solenoid c of valve 155 is energized by way of line 185, solenoid c, line 191, normally closed relay 16a, line 193, closed relay 145a, line 194, and switch 112 to line 189. As previously described, valve 155 is thereby conditioned so that delivery of pump 144 through line 154, discharges directly to exhaust line 164.

A work piece is now loaded into the machine and switch 195 is closed to thereby energize main driving motor 16 by way of line 185, starting switch 195, stop switch 196, relay coil 197, normally closed relay 173b, motor 16, normally closed relay 199a, and line 200 to main line 189. Energization of coil 197 establishes a holding circuit by way of line 185, relay contacts 197a and line 201, as will be obvious from inspection of Figure IX. Energization of motor 16 operates to open normally closed relay 16a to thereby de-energize solenoid c, whereupon, valve 155 is biased under influence of its springs to connect high pressure delivery line 154 to traverse line 156. The tools are now rapidly traversed toward the rotating work piece and segmental disc 114 and its cams are rotated as has been previously described. As soon as rotation of the disc begins, cam 152 is moved out of contact with switch 112 whereby said switch opens to thereby maintain solenoid c de-energized.

As soon as the tools have been traversed substantially into contact with the work piece, cam 116 engages the plunger of valve 113 and begins to close the same. Shortly thereafter, cam 111a engages and closes switch 111 to thereby energize solenoid a by way of line 185, solenoid a, line 202, and switch 111 to main line 189. As previously described, energization of solenoid a operates to close valve 157 and divert fluid flow to cylinder 87, by way of now partially closed valve 113. Thereby, the speed of the tools is reduced to the proper feeding value as they contact the work piece and begin to cut.

Cutting now proceeds at a feeding speed directly controlled by valve 113 and cam 116 until, as the final diameter of the work piece is approached, cams 109a and 110a engage and close their respective switches 109 and 110 at substantially the same time.

Closure of switch 109 operates to energize relay coil 173 by way of line 185, line 203, reconditioning switch 204, coil 173, line 205 and switch 109 and line 189. However, as 173 is a time relay, it does not immediately act to operate its blades.

Closure of switch 110 operates to energize relay coil 199 by way of lines 185, 206, coil 199 and switch 110, to open normally closed blades 199a and to close blades 199b whereby a portion of the field coils of motor 16 are cut out and the motor speed is increased at substantially the same time as rack 93 engages and is positively stopped by pin 104. This operates to put an extremely accurate and highly finished surface upon the line bearings B of the work piece.

Motor 16 continues to rotate at high speed for a few seconds or until energized relay coil 173 acts to operate its blades. As soon as relay 173 acts, normally closed blades 173b are opened to deenergize and stop motor 16; to establish a holding circuit by way of line 207, blades 173c and line 208; and to close blades 173a. Closure of blades 173a operates to energize valve solenoid b by way of line 185, solenoid b, normally closed relay 211a, line 219, now closed blades 173a, and lines 210 and 189.

Energization of solenoid b, as previously described, operates to condition valve 155 so that high pressure line 154 is connected to retraction line 163 while traverse line 168 is connected to exhaust line 164. Fluid is now forced through lines 163 and 161 to the retraction side of piston 89 to rapidly retract the tools and reversely rotate segmental disc 114. Rotation of cam 111a out of contact with switch 111 and de-energize solenoid a, has no effect since fluid forced out by upward movement of piston 89 can flow only to line 168 and exhaust line 164. Because of its holding circuit, relay coil 173 remains energized when cam 109a rotates out of contact with its switch, and the circuit energizing solenoid b remains closed while the circuit of motor 16 remains open with consequent closure of blades 16a.

As soon as cam 152 again contacts and closes switch 112, solenoid c is energized and relay coil 211 again opens the normally closed blades 211a, deenergizes solenoid b and conditions valve 155 to connect delivery line 154 directly to exhaust. Since solenoid b is not required to operate at the same time as solenoid c, it is possible to eliminate relay 211 by making solenoid c powerful enough to overcome the solenoid b, provided only that the solenoid armatures are positively mechanically connected in opposition so that movement of the armature of solenoid c in its energized direction reversely shifts the armature of solenoid b.

As delivery of pump 144 is now diverted directly to exhaust, retraction movements of the tools cease and all parts of the lathe come to rest. Stop or reconditioning switch 196 is now manually operated and as this switch is mechanically connected with the blades of switch 204, as indicated by the dotted line 212, Figure IX, the circuit through time relay coil 173 is broken, blades 173b close, 173a open, and the holding circuit 207, 208 is broken.

The lathe is now in condition for a new cycle of operations. The finished work piece is removed, the lathe reloaded, and switch 195 is closed to initiate a cutting cycle. When the machine is to remain idle for any appreciable period of time, switch 183 is manually operated to open all circuits that might be closed, such as the one servicing motor 145.

From the foregoing description, it will be clear that we have provided a lathe that is well adapted for automatic and rapid finishing of articles such as crankshafts. All cuts are made in one pass of the cutting tools, and all tools operate simultaneously upon the article being turned. Our lathe is rapid in operation for not only are all cuts made in one pass of the tools, but traverse and retraction movements are effected at high speed while the tools are slowed to proper feeding speed just before cutting begins. During the initial cuts, such as in facing the cheeks of a crankshaft, where the highest accuracy is not required, the feeding of the tools may proceed at a relatively rapid rate, while, because of the action of valves 157 and 113, in cooperation with cam 116, the feeding speed may be reduced to any desired value. In fact, by providing a cam 116 having the desired contour, the feeding speed may be varied in any desired sequence. It is within the purview of our invention to provide cams 116 that are given the proper contour to effect correct feeding speeds for each individual job or type of work piece. At the moment that the tools have substantially completed the line bearing surfaces, their feeding movement is positively stopped, the driving motor is automatically speeded up and a high precision finish is given to the bearing surfaces during the few seconds that such rapid rotation takes place until relay 173 acts to stop the driving motor and effect rapid retraction of the tools.

While, for the purpose of complying with the patent statutes, we have selected and described a machine adapted for a particular job, it will be understood that the invention is not so limited, but that numerous other types of work may be turned in the lathe and correctly handled by various contours and adjustments of the cams. Furthermore, numerous modifications and substitutions will occur to those skilled in this art. It is our intention to reserve all such modifications and substitutions as fall within the scope of the subjoined claims.

Having thus fully set forth and described this invention, what is claimed as new and desired to be secured by United States Letters Patent is:

1. In a control circuit for a fluid pressure actuating cylinder, a fluid pressure pump, a three-way valve having a first and a second actuating solenoid for shifting said valve each side of an intermediate position, fluid conduit means for connecting said pump to said valve, a two-way valve having a third actuating solenoid, fluid conduit means connecting said three-way valve to said two-way valve, fluid conduit means connected between the output from said two-way valve to the forward pressure chamber of said actuating cylinder including a check valve limiting flow from said two-way valve to said cylinder, fluid conduit means connected between said three-way valve and the return pressure chamber of said actuating cylinder, a rate varying valve having its input connected to the fluid conduit means between said three-way and said two-way valves, fluid conduit means connecting the output from said rate varying valve to the forward pressure chamber of said actuating cylinder, a check valve connected across the input and output of said rate varying valve to allow free flow from the forward pressure chamber of said fluid pressure actuating cylinder to the fluid conduit means between the three-way and two-way valves, and an electrical circuit connected to said solenoids, including switching means actuated by the movement of the movable element of said fluid pressure actuating cylinder.

2. In a control circuit for a fluid pressure actuating cylinder, a fluid pressure pump, a three-way valve having a first and a second actuating solenoid for shifting said valve each side of an intermediate position, fluid conduit means for connecting said pump to said valve, a two-way valve having a third actuating solenoid, fluid conduit means connecting said three-way valve to said two-way valve, fluid conduit means connected between the output from said two-way valve to the forward pressure chamber of said actuating cylinder including a check valve limiting flow from said two-way valve to said cylinder, fluid conduit means connected between said three-way valve and the return pressure chamber of said actuating cylinder, a rate varying valve having its input connected to the fluid conduit means between said three-way and said two-way valves, fluid conduit means connecting the output from said rate varying valve to the forward pressure chamber of said actuating cylinder, a check valve connected across the input and output of said rate varying valve to allow free flow from the forward pressure chamber of said fluid pressure actuating cylinder to the fluid conduit means between the three-way and two-way valves, and an electrical circuit connected to said solenoids, including switching means actuated by the movement of the movable element of said fluid pressure actuating cylinder, said switching means including a first switch connected to said first solenoid actuable to energize said solenoid to shift said three-way valve to connect fluid pressure from said pump to said two-way valve, a second switch connected to the third solenoid of said two-way valve actuable to energize said solenoid to close off said valve to prevent fluid flow into the conduit connected to the forward pressure chamber of said cylinder, and an electric delay timer switch connected to said second solenoid of said three-way valve to energize said solenoid after a predetermined interval has elapsed from the time it is initially actuated.

3. In a control circuit for a fluid pressure actuating cylinder, a fluid pressure pump, a three-way valve having a first and a second actuating solenoid for shifting said valve each side of an intermediate position, fluid conduit means for connecting said pump to said valve, a two-way valve having a third actuating solenoid, fluid conduit means connecting said three-way valve to said two-way valve, fluid conduit means connected between the output from said two-way valve to the forward pressure chamber of said actuating cylinder including a check valve limiting flow from said two-way valve to said cylinder, fluid conduit means connected between said three-way valve and the return pressure chamber of said actuating cylinder, a rate varying valve having its input connected to the fluid conduit means between said three-way and said two-way valves, fluid conduit means connecting the output from said rate varying valve to the forward pressure chamber of said actuating cylinder, a check valve connected across the input and output of said rate varying valve to allow free flow from the forward pressure chamber of said fluid pressure actuating cylinder to the fluid conduit means between the three-way and two-way valves, and an electrical circuit connected to said solenoids, including switching means actuated by the movement of the movable element of said fluid pressure actuating cylinder, said switching means including a first switch connected to said first solenoid actuable to energize said solenoid to shift said three-way valve to connect fluid pressure from said pump to said two-way valve, a second switch connected to the third solenoid of said two-way valve actuable to energize said solenoid to close off said valve to prevent fluid flow into the conduit connected to the forward pressure chamber of said cylinder, and an electric delay timer switch connected to said second solenoid of said three-way valve to energize said solenoid after a predetermined interval has elapsed from the time it is initially actuated, and abutment means engaged by the movable element of said fluid pressure actuating cylinder to positively arrest the forward movement of said element in a predetermined position.

4. In a control circuit for a fluid pressure actuating cylinder, a fluid pressure pump, a three-way valve having a first and a second actuating solenoid for shifting said valve each side of an intermediate position, fluid conduit means including a pilot pressure valve for connecting said pump to said valve, a two-way valve having a third actuating solenoid, fluid conduit means connecting said three-way valve to said two-way valve, fluid conduit means connected between the output from said two-way valve to the forward pressure chamber of said actuating cylinder including a check valve limiting flow from said two-way valve to said cylinder, fluid conduit means connected between said three-way valve and the return pressure chamber of said actuating cylinder, a rate varying valve having its input connected to the fluid conduit means between said three-way and said two-way valves, fluid conduit means connecting the output from said rate varying valve to the forward pressure chamber of said actuating cylinder, a check valve connected across the input and output of said rate varying valve to allow free flow from the forward pressure chamber of said fluid pressure actuating cylinder to the fluid conduit means between the three-way and two-way valves, and an electrical circuit connected to said solenoids including switching means actuated by the movement of the movable element of said fluid pressure actuating cylinder.

5. In a control circuit for a fluid pressure actuating cylinder, a fluid pressure pump, a three-way valve having a first and a second actuating solenoid for shifting said valve each side of an intermediate position, fluid conduit means for connecting said pump to said valve, a two-way valve having a third actuating solenoid, fluid conduit means connecting said three-way valve to said two-way valve, fluid conduit means connected between the output from said two-way valve to the forward pressure chamber of said actuating cylinder including a check valve limiting flow from said two-way valve to said cylinder, fluid conduit means including a back pressure valve connected between said three-way valve and the return pressure chamber of said actuating cylinder, a rate varying valve having its input connected to the fluid conduit means between said three-way and said two-way valves, fluid conduit means connecting the output from said rate varying valve to the forward pressure chamber of said actuating cylinder, a check valve connected across the input and output of said rate varying valve to allow free flow from the forward pressure chamber of said fluid pressure actuating cylinder to the fluid conduit means between the three-way and two-way valves, and an electrical circuit connected to said solenoids, including switching means actuated by the movement of the movable element of said fluid pressure actuating cylinder.

6. In a control circuit for a fluid pressure actuating cylinder, a fluid pressure pump, a three-way valve having a first and a second actuating solenoid for shifting said valve each side of an intermediate position, fluid conduit means including a pilot pressure valve for connecting said pump to said valve, a two-way valve having a third actuating solenoid, fluid conduit means connecting said three-way valve to said two-way valve, fluid conduit means connected between the output from said two-way valve to the forward pressure chamber of said actuating cylinder including a check valve limiting flow from said two-way valve to said cylinder, fluid conduit means including a back pressure valve connected between said three-way valve and the return pressure chamber of said actuating cylinder, a rate varying valve having its input connected to the fluid conduit means between said three-way and said two-way valves, fluid conduit means connecting the output from said rate varying valve to the forward pressure chamber of said actuating cylinder, a check valve connected across the input and output of said rate varying valve to allow free flow from the forward pressure chamber of said fluid pressure actuating cylinder to the fluid conduit means between the three-way and two-way valves, and an electrical circuit connected to said solenoids, including switching means actuated by the movement of the movable element of said fluid pressure actuating cylinder.

WILLIAM F. GROENE.
HAROLD J. SIEKMANN.
WALTER R. MEYER.

REFERENCES CITED

The following references are of record in the file of this patent:

UNITED STATES PATENTS

| Number | Name | Date |
|---|---|---|
| 2,138,964 | Groene | Dec. 6, 1938 |
| 2,191,935 | Groene | Feb. 27, 1940 |